(12) United States Patent
Li et al.

(10) Patent No.: US 8,993,065 B2
(45) Date of Patent: Mar. 31, 2015

(54) SUBSTRATE COATING WITH AQUEOUS-BASED MULTIFUNCTIONAL CORE SHELL PARTICLES

(75) Inventors: Pei Li, Hong Kong (CN); Yong Jin, Chenda (CN)

(73) Assignee: The Hong Kong Polytechnic University, Hung Hom, Kowloon, Hong Kong (CN)

( * ) Notice: Subject to any disclaimer, the term of this patent is extended or adjusted under 35 U.S.C. 154(b) by 1920 days.

(21) Appl. No.: 11/701,476

(22) Filed: Feb. 2, 2007

(65) Prior Publication Data

US 2008/0187707 A1   Aug. 7, 2008

(51) Int. Cl.
| | | |
|---|---|---|
| *B05D 3/02* | (2006.01) | |
| *C08F 279/02* | (2006.01) | |
| *C08F 255/00* | (2006.01) | |
| *C08F 265/00* | (2006.01) | |
| *C08F 265/04* | (2006.01) | |
| *C08F 291/00* | (2006.01) | |
| *C08L 51/00* | (2006.01) | |
| *C09D 151/00* | (2006.01) | |

(52) U.S. Cl.
CPC ............ *C08F 279/02* (2013.01); *C08F 255/00* (2013.01); *C08F 265/00* (2013.01); *C08F 265/04* (2013.01); *C08F 291/00* (2013.01); *C08L 51/003* (2013.01); *C09D 151/003* (2013.01)
USPC .......................................... 427/384; 427/394

(58) Field of Classification Search
CPC .... C08F 255/00; C08F 265/00; C08F 265/04; C08F 279/02; C08F 291/00; C08L 51/003; C09D 151/003; B05D 7/12; B05D 2203/24
USPC .................................................. 427/384, 394
See application file for complete search history.

(56) References Cited

U.S. PATENT DOCUMENTS

| | | | |
|---|---|---|---|
| 3,943,252 A | 3/1976 | Schroer et al. | |
| 4,374,872 A | 2/1983 | Eckert et al. | |
| 5,019,403 A | 5/1991 | Krochta | |
| 6,573,313 B2 | 6/2003 | Li et al. | |
| 6,767,638 B2 * | 7/2004 | Samaranayake | ............. 428/407 |

OTHER PUBLICATIONS

Gao et al. "Graft Copolymerization of N-vinylpyrrolidone onto Gelatin" Journal of Applied Polymer Science, vol. 55, 1995, pp. 1291-1299.*

Zhang et al. "Synthesis and Characterization of Chitosan Grafted Poly(N,N-dimethyl-N-methacryloxyethyl-N-(3-sulfopropyl)ammonium) initiated by ceric (IV) ion" European Polymer Journal 39 (2003) pp. 847-850.*

* cited by examiner

*Primary Examiner* — Robert S Walters, Jr.
(74) *Attorney, Agent, or Firm* — Duane Morris LLP; Siegfried J. W. Ruppert (57) ABSTRACT

The present invention relates to a method of making a coated substrate, and products therefrom, using a coating possessing a nanoparticle having a shell containing a hydrophilic nitrogen containing compound and a vinylic polymer having quaternary ammonium compounds, and a core made of at least a hydrophobic vinylic polymer, wherein such coated substrate exhibits antibacterial properties without the use of harmful organic preservatives.

19 Claims, 7 Drawing Sheets

| Sample treatment | Leather coated with casein Solution (Sample B) | Leather coated with core-shell nanoparticles (Sample A) |
|---|---|---|
| Dry rub resistance[1] | 4.0 | 3.5 |
| Wet rub resistance[1] | 1.5 | 2.5 |

[1] Grade (1-5) (5= the highest resistance)

FIG 6

| Measurement | Leather coated with casein solution (Sample B) | Leather coated with core-shell nanoparticles (Sample A) |
|---|---|---|
| Contact angle (Average) | 57.6° | 128.2° |

FIG 7

| Sample | Treatment time (h) | Bacterial reduction (%) |
|---|---|---|
| A | 1 | 99.8 |
|   | 2 | 100 |
| B | 1 | 4.6 |
|   | 2 | 6.6 |
| C | 1 | 1.6 |
|   | 2 | 2.4 |

SUBSTRATE COATING WITH AQUEOUS-BASED MULTIFUNCTIONAL CORE SHELL PARTICLES

CROSS-REFERENCE TO RELATED APPLICATIONS

"Not Applicable"

STATEMENT REGARDING FEDERALLY SPONSORED RESEARCH OR DEVELOPMENT

"Not Applicable"

THE NAMES OF THE PARTIES TO A JOINT RESEARCH AGREEMENT

"Not Applicable"

BACKGROUND OF THE INVENTION

1. Field of the Invention

The present invention relates to a nanoparticle having a shell with antibacterial property.

2. Description of Related Art

Nitrogen containing compounds including proteins have been used for a long time as a coating and painting material. For example, U.S. Pat. No. 3,943,252 teaches the use of leather dressing coatings based on plasticized casein and formaldehyde. Preservatives such as formaldehyde were used because they were deemed to reduce the water sensitivity of a nitrogen containing compounds such as casein. Because a protein such as casein possesses an inherent hydrophilicity, it is not water resistant, hence casein coatings are easily contaminated by bacteria. However, research has shown that the use of preservatives such as formaldehyde are disadvantageous because of the toxic nature of formaldehyde, leading to it having a negative affect of the environment and on the public health.

To address the concerns of the use of such preservatives, other preservatives such as ureas have been employed. However, as ureas have a tendency to breakdown to ammonia, these preservatives also are not suitable for products that may be edible or to be used for a substantial period of time.

In furtherance of attempting to avoid bacteria contamination of nitrogen containing compounds, especially proteins, the prior art has taught the production of nanoparticles containing such compounds in shells (see U.S. Pat. No. 6,573,313 to Li et al.). However, these efforts have failed to effectively reduce bacteria growth in substrates possessing such particles.

Therefore, new methods to improve the antibacterial property of coatings containing nitrogen containing compounds, such as casein, are needed.

It is an object of the present system to overcome these and other disadvantages in the prior art.

BRIEF SUMMARY OF THE INVENTION

The present invention proposes substrates containing nano-particles made of a shell with at least one nitrogen containing compound and a grafted polymer having quaternary ammonium groups, and a core having at least one hydrophobic polymer. The resulting substrates possess no organic preservatives, while exhibiting high antibacterial properties. In addition, the substrates exhibit many beneficial properties, including flexible endurance, increased wet-rub resistance, improved water repellance, and an improvement in look and feel.

The present invention also teaches a method of making such substrates, with no preservatives by applying nanoparticles having a shell with at least one nitrogen containing compound and a grafted polymer having quaternary ammonium groups, and a core made of hydrophobic polymer in the core.

Still further, the present invention teaches making leather products from leather substrates, such products possessing no organic preservatives, by applying to the leather substrates a coating containing nanoparticles made by the instant invention.

Still yet, the present invention teaches methods of making nanoparticles having shells with at least one nitrogen containing compound and a grafted polymer having quaternary ammonium groups, and a core made of at least one hydrophobic polymer.

BRIEF DESCRIPTION OF THE SEVERAL VIEWS OF THE DRAWING(S)

These and other features, aspects, and advantages of the apparatus and methods of the present invention will become better understood from the following description, appended claims, and accompanying drawings where:

DETAILED DESCRIPTION OF THE INVENTION

The following description of certain exemplary embodiment(s) is merely exemplary in nature and is in no way intended to limit the invention, its application, or uses. Throughout this description, the term "organic preservative" refers to a natural or synthetic chemical that is generally separately added to substrates and/or products as a coating to retard spoilage, whether from microbial growth, degradation of coatings applied to substrates and/or products, or undesirable chemical changes, including growth of bacteria or the oxidation of a substrate or product, and including toxic resultant compounds derived from the breakdown of the organic preservative. Examples of organic preservatives include formaldehyde and urea compounds.

The term "substrate" refers to a base material from which products may be manufactured from.

The term "products" refers to consumer goods and industrial goods that generally derived from a substrate base.

The term "hydrophobic" in reference to a monomer or compound includes monomers or compounds that are merely soluble in water from 20° C. to 100° C., soluble in water at room temperature but insoluble in heated water, and/or soluble in water but insoluble in polymer-derivative form.

The term "nanoparticle" refers to a particle in nano-size or sub-micron size that exhibits different physical properties than the bulk material or larger size from which it is derived.

FIGS. 1-8 show embodiments of the present invention and the present method.

Figure 1:
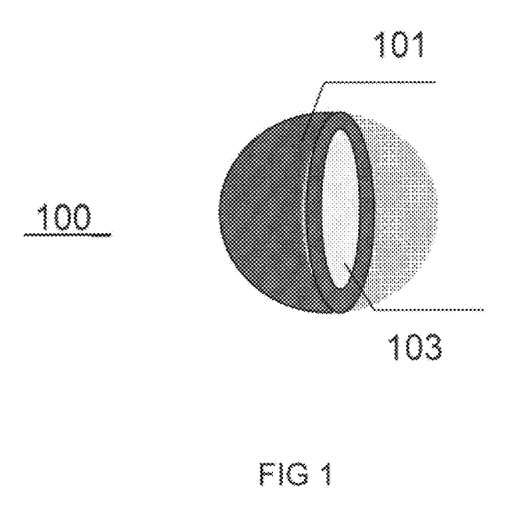
FIG. 1 shows a particle made in accordance with the present invention.

FIG. 1 is an embodiment of a nanoparticle 100 made in accordance with the present invention and to be used in the present method of making a substrate, such particle being a nanoparticle 100 containing a shell 101 and a core 103.

The shell 101 contains hydrophilic nitrogen containing compounds including biopolymers and synthetic polymers. Biopolymers include regenerated naturally occurring proteins that can be derived from sources such as corn, milk, peanuts, soybeans, and connective tissue. For example, the protein casein derived from milk is suitable for use as the hydrophilic nitrogen containing compounds. Examples of nitrogen containing compounds include proteins such as casein, collagen, gelatin, bovine serum albumin, silk fibroin, etc. At least one hydrophilic nitrogen containing compound can be present in the shell 101.

Within the synthetic nitrogen containing compound, nitrogen can be present as an amine group. Primary amine ($-NH_2$), secondary amine ($-NHR$), tertiary amine ($-NR_2$) and quaternary ammonium ion are examples of functional groups. Structurally, the amino containing polymers may be in the form of linear or cyclic aliphatic or aromatic amine. The amino function may be located in the polymer main chain or in the side chains. Biopolymers and synthetic polymer containing amino groups give high conversion of the hydrophobic monomer and form very stable core-shell nanoparticles with narrow size distribution.

The shell 101 also contains one or more grafted polymer having quaternary ammonium groups. As will be discussed later, the polymer having the quaternary ammonium groups are grafted onto the hydrophilic nitrogen containing compounds during synthesis of the nanoparticles.

Suitable monomers having quaternary ammonium groups for inclusion in the shell 101 include water soluble vinylic monomers having quaternary ammonium groups of the general formula where $R_4$, $R_1$, $R_2$, and $R_3$ can be independently selected from the group consisting of hydrogen, alkyl, alkenyl, alkynyl, acyl, aryl, carboxylate, alkoxy carbonyl, arloxycarbonyl, carboxamide, alkyl amine, acyl amino, alkoxyl, acyloxy, hydroxyalkyl, alkyoxyalkyl, aminoalkyl, (alkylamino)alkyl, thio, alkylthio, thioalkyl, (alkylhio)alkyl, carbomoyl, sulfonyl, sulfonate, sulfonamide, sulfonylamino, sulfonyloxyl, methyl, phenyl, heteraryl, monocylic heteroaryl with 4 to 8 ring atoms, with ring atoms selected from nitrogen, oxygen, or sulfur, chloro, or cyano, halogen.

Suitable monomers having quaternary ammonium groups for inclusion in the shell 101 include water soluble vinylic monomers having quaternary ammonium groups of the general formula—$+NR_1R_2R_3$, where $R_1$, $R_2$, and $R_3$ can be independently selected from the group consisting of hydrogen, alkyl, alkenyl, alkynyl, acyl, aryl, carboxylate, alkoxy carbonyl, arloxycarbonyl, carboxamide, alkyl amine, acyl amino, alkoxyl, acyloxy, hydroxyalkyl, alkyoxyalkyl, aminoalkyl, (alkylamino)alkyl, thio, alkylthio, thioalkyl, (alkythio)alkyl, carbomoyl, sulfonyl, sulfonate, sulfonamide, sulfonylamino, sulfonyloxyl, methyl, phenyl, heteraryl, monocylic heteroaryl with 4 to 8 ring atoms, with ring atoms selected from nitrogen, oxygen, or sulfur, chloro, or cyano, halogen.

The core 103 of the nanoparticle 100 can be at least one hydrophobic polymer which is formed via a free-radical polymerization of monomer. Suitable monomers include vinylic monomers in the form of a vinyls, a diene, an acrylate monomer, or an acrylamide monomer. Examples of vinylic monomers include those of formula $R^1 R^2C=CH_2$, where $R^1$ hydrogen or alky, and where $R^2$ is alkyl, aryl, heteroaryl, halo cyano, or other suitable hydrophobic group. Groupss for $R^1$ include hydrogen and methyl. Groups for $R^2$ include $C^1$-$C^6$ alkyl; phenyl; monocyclic heteroaryl with 4 to 8 ring atoms, more preferably 5 or 6 ring atoms, and with 1, 2 or 3 ring heteratoms, preferably 1 or 2, more preferably 1 ring atom, selected from nitrogen, oxygen or sulfur; chloro; and cyano. Examples of dienes include those of formula $CH_2=C(R^1)-C(R^2)=CH_2$ where $R^1$ is hydrogen or halogen or alkyl, and where $R^2$ is hydrogen or alkyl, such as $C_1$-$C_6$ alkyl. Groups for $R^1$ include hydrogen, chloride and methyl. Groups for $R^2$ include hydrogen and methyl. Examples of acrylate monomers include those of formula $CH_2=CR^3-COOR^4$, where $R^3$ is hydrogen or alky, and where $R^4$ is alkyl or substituted allyl, or other suitable hydrophobic group. Groups for $R^3$ include hydrogen and methyl. Groups for $R^4$ include $C_1$-$C_{16}$, for example $C_1$-$C_{12}$, alkyl which may be straight-chain or branched, and such groups substituted with one or more substituents chosen from unsubstituted amino, monosubstituted amino, disubstituted amino, hydroxy, carboxy, or other usual acrylate substituent. Acrylate monomers can comprise methyl methacrylate, ethyl methacrylate, isopropyl methacrylate, n-butyl methacrylate, and the like. Examples of acrylamide monomers include those of formula $CH_2=CR^3-COONHR^4$, where $R^3$ and $R^4$ are as defined.

Possible types of vinyl monomers are shown in table 1.

TABLE 1

Structures of Various Vinyl Monomers

| Type of Vinyl Monomer | R | R' |
|---|---|---|
| Vinyls $CH_2=\underset{R'}{\overset{R}{C}}$ | —H<br>—$CH_3$<br>—Cl | Alkyl<br>Phenyl<br>Pyridine<br>—Cl<br>—CN<br>—OAc |
| Diene $CH_2=\underset{}{\overset{R}{C}}-\underset{}{\overset{R'}{C}}=CH_2$ | —H<br>—Cl<br>—$CH_3$ | H<br>$CH_3$ |
| Acrylates $CH_2=\underset{\underset{OR'}{\overset{\|}{C=O}}}{\overset{R}{C}}$ | —H<br>—$CH_3$ | Linear or branched alkyl groups<br>Alkyl groups containing functional groups such as amine, hydroxyl, carboxylic acid etc. |

TABLE 1-continued

Structures of Various Vinyl Monomers

| Type of Vinyl Monomer | R | R' |
|---|---|---|
| Acrylamides  | —H —CH$_3$ | Linear or branched alkyl groups Alkyl groups containing functional groups such as amine, hydroxyl, carboxylic acid etc. |

It is believed that, through the incorporation of the monomers having quaternary ammonium groups into the shell 101, it will now be possible to avoid bacteria contamination of substrates resulting from the use of hydrophilic nitrogen containing compound in the shell 101.

Figure 2:
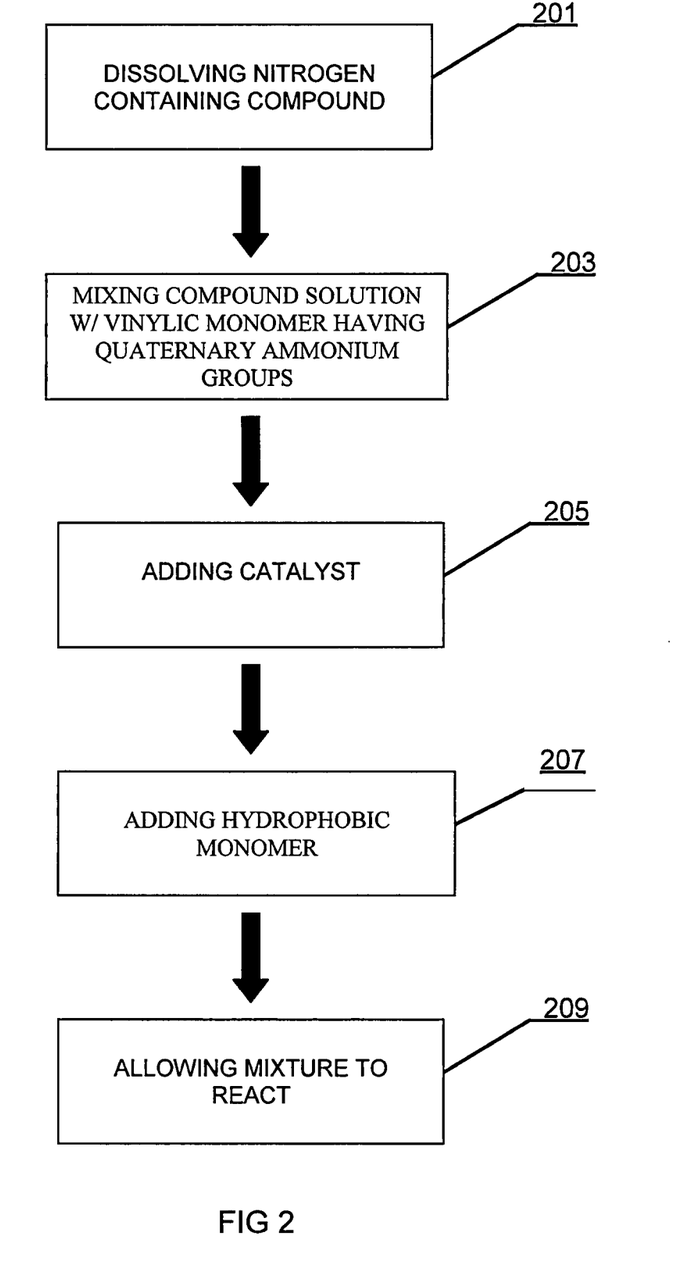
FIG. 2 shows a method of making a particle to be used in the present method.

FIG. 2 is an embodiment of making the nanoparticle in accordance with the present invention, wherein a hydrophilic nitrogen containing compound is dissolved in an aqueous medium 201; the resulting solution is mixed with a hydrophilic vinylic monomer having quaternary ammonium groups 203, a catalyst is added thereto 205, a hydrophobic vinylic monomer or a mixture of monomers is added to the solution 207, and the solution is allowed to react 209.

The hydrophilic nitrogen containing compound can be dissolved in an aqueous medium 201 such as water, acid or alkali, or other appropriate system chosen to suit the compound, such as having an appropriate pH and temperature. In one embodiment, casein can be dissolved in sodium carbonate solution.

The resulting solution can be mixed with a hydrophilic vinylic monomer containing quaternary ammonium groups 203 in a weight percentage of 2 to 50% of the nitrogen containing compound. In one embodiment, there is 1 g of the nitrogen containing compound, casein, and 0.4 g of the vinylic monomer with quaternary ammonium groups.

It is believed the vinylic monomer with quaternary ammonium groups is incorporated with the nitrogen containing compound through graft polymerization of the vinylic monomers unto the nitrogen containing comopound. The hydrophilic vinylic polymer becomes covalently linked to the nitrogen containing compound.

Reasoning for polymerizing a monomer with quaternary ammonium groups with the nitrogen containing compound is the vinylic monomers with quaternary ammonium groups can effectively prevent bacteria contamination in the nitrogen containing compound shell. Further, such vinylic monomers are water-soluble, inexpensive, commercially available, easily undergo graft polymerization, and can form hydrophilic shells with the nitrogen containing compound.

Adding a catalyst 205 can include adding for example, alkyl peroxide, hydroperoxide, azo-initiators, persulfate, redox initiating system, and a metal based radical initiator.

Alkyl hydroperoxides (ROOH) such as t-butyl hydroperoxide (TBHP, t-BuOOH) and cumene hydroperoxide (CHP) are seldom used alone to initiate a polymerization reaction due to high decomposition temperature (half life time=0.44 h at 150° C., and 12 h at 120° C.). In addition, hydrogen of ROOH is susceptible to be abstracted by HO⁻ or RO⁻ radical to form peroxy radical, which is not sufficiently reactive to initiate the polymerisation of vinylic monomer. Thus, alkyl hydroperoxides are poor initiators and need to be activated by other reagents. For example, cumene hydroperoxide has been extensively used with $Fe^{2+}$ in low temperature polymerization. Besides metal ion, low molecular weights of polyamines have also found to form redox pairs with alkyl hydroperoxides and activate their decomposition. For instance, TBHP/ tetraethylene pentamine (TEPA) has been employed to prepare natural rubber/PMMA composite latexes.

Alkyl hydroperoxides such as t-butyl hydroperoxide, cumene hydroperoxide, p-isopropyl cumene hydroperoxide, p-menthane hydroperoxide and pinane hydroperoxide are suitable initiating agents to induce the graft copolymerization of vinyl monomer onto the water-soluble polymers. Grafting percentage can be as high as 300% of the hydrophilic polymer backbone. To compare the grafting efficiency using TBHP/ TEPA system, methyl methacrylate (MMA) was allowed to polymerize in this initiator system in the presence of BSA or gelatin at 40° C. High conversion of MMA (>90%) was achieved after 2 hours, but only homopolymer of PMMA was obtained. No grafting products were isolated.

Since our study of reaction temperature indicates that ROOH-induced graft copolymerization of MMA onto BSA or gelatin only occurs above 70° C., the PMMA homopolymer obtained must have initiated by the ROOH/TEPA redox system. Interestingly, when the polymerization was raised to 80° C., similar result was obtained. These results suggest that the ROOH/TEPA initiating system is so reactive that the ROOH has no chance to interact with the amine groups of the protein, and generates grafting sites on the biopolymer backbone. Thus only homopolymer of PMMA was obtained. Other radical initiators have also been carefully investigated for the graft copolymerization of MMA from various water-soluble polymers.

Studies of various initiators for the graft copolymerization demonstrate that besides the ROOH, some other radical initiators such as KPS and V-50 are also able to perform the similar reactions, and give comparable results. But oil soluble initiators such as azobisisobutyronitrile (AIBN), benzoyl peroxide (BPO), and tributylphosphate (TBP) give low conversions of MMA. Although KPS and V-50 have been used in the graft copolymerization of various vinyl monomers onto the boipolymers, the mole ratios of monomer to these initiators are usually between 100 to 500:1, while the mole ratios of MMA to KPS and V-50 required in our system are much less (5000:1). Furthermore, formation of particles with core-shell structure using such initiators has never been addressed in the literature.

Although use of KPS gives comparable results to the use of TBHP for the graft copolymerization of MMA from casein, much lower conversion was obtained when it was used in the graft copolymerization of MMA from polyethyleneimine (PEI). On the other hand, high conversion of MMA could be achieved when using V-50, but grafting efficiency was significantly reduced, indicating that more homopolymer was formed. These results evidently demonstrate that use of TBHP has obviously advantages than other initiators in the presence of PEI.

Interestingly, when TBHP was used alone to initiate the graft copolymerization of MMA from poly(vinyl alcohol), the polymerization did not occur effectively. On the other hand, using TBHP/TEPA gave quantitative conversion, but no grafted copolymer was isolated. These results evidently prove that TBHP indeed interacts with amine groups of the hydrophilic polymer to form redox pair. Thus the high grafting efficiency achieved in PEI/MMA/TBHP system is attributed from the formation of redox pair between amine groups on PEI and TBHP. Two reactive radicals are generated. One is on the PEI backbone, which initiate the graft copolymerization of MMA. Another one is RO⁻ radical, which tends to initiate the homopolymerization of vinylic monomer.

The graft copolymerization temperatures were found to be strongly dependent upon the structures of hydrophilic polymers. The effect of reaction temperature may be associated with the quantity of amino groups and their availability in each hydrophilic polymer.

The mole ratio of vinylic monomer to catalyst can be more than 1000:1. In one embodiment, the mole ratio is 5000:1.

Following the addition of a second monomer 207, such as a vinylic hydrophobic monomer being described previously, the mixture is allowed to react. The reaction might proceed at ambient temperature, but usually an elevated temperature is more effective, typically 30 to 95° C. In one embodiment, the reaction proceeds at a temperature of from 60 to 85° C. for a period of 1 to 5 hours under an appropriate atmosphere, such as nitrogen, and agitation, such as stirring.

Alternative embodiments of the above method should be particularly noted.

In one embodiment, more than one vinylic monomer may be added to the hydrophilic nitrogen containing compound aqueous solution. The additional hydrophilic vinylic monomers may or may not contain quaternary ammonium groups. Further, the additional vinylic monomers may possess additional properties that will allow the shell of the nanoparticle to exhibit different characteristics. For example, additional vinylic monomers may possess qualities such as increasing hardness of the resulting nanoparticle. In addition, the additional monomers may be added in a stepwise format, i.e., one after the other. In such fashion, the monomers will become grafted unto the nitrogen containing compound in the order in which they were added to the solution.

In another embodiment, the addition of the monomers, i.e., at 203 and 207, may take place in one step. For example, the vinylic monomer having quaternary ammonium groups and the hydrophobic vinylic monomer may be added together at step 203, therefore allowing the elimination of 207. This alternative embodiment allows the elimination of one step, thus making the entire process more efficient, cost saving, and time conscientious.

Figure 3:
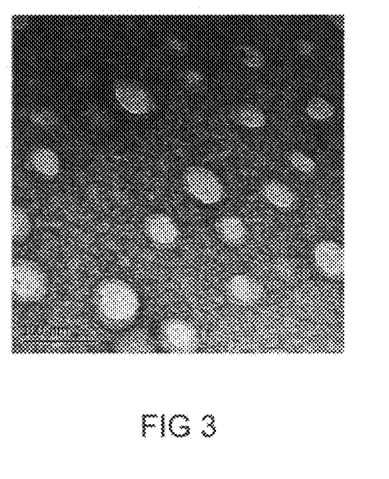
FIG. 3 is a transmission electron microscopic (TEM) image of the core-shell particles.

FIG. 3 is a transmission electron microscope (TEM) image of nanoparticles made in accordance with the above method. Particles made in accordance with the above method have various sizes from 50 to 500 nm in diameter, measured as Dn, the number average diameter, depending on the types of nitrogen containing compound and monomer. In one embodiment, the Dn is between 50 and 150 nm in diameter. The size distribution is narrow, Dn/Dv values as a measure of size distribution are in the range of about 1.05 to 1.5. In one embodiment, the Dn/Dv values are between 1.05 and 1.25. The polydiversity, Mw/Mn, of the polymerized vinylic monomer is in the range of 1.5 to 3. The viscosity of the particle dispersion may be from 1 to 1000 centipoise as measured using a viscometer. The solid content may be from about 0.5 to 40% by weight.

Figure 4:
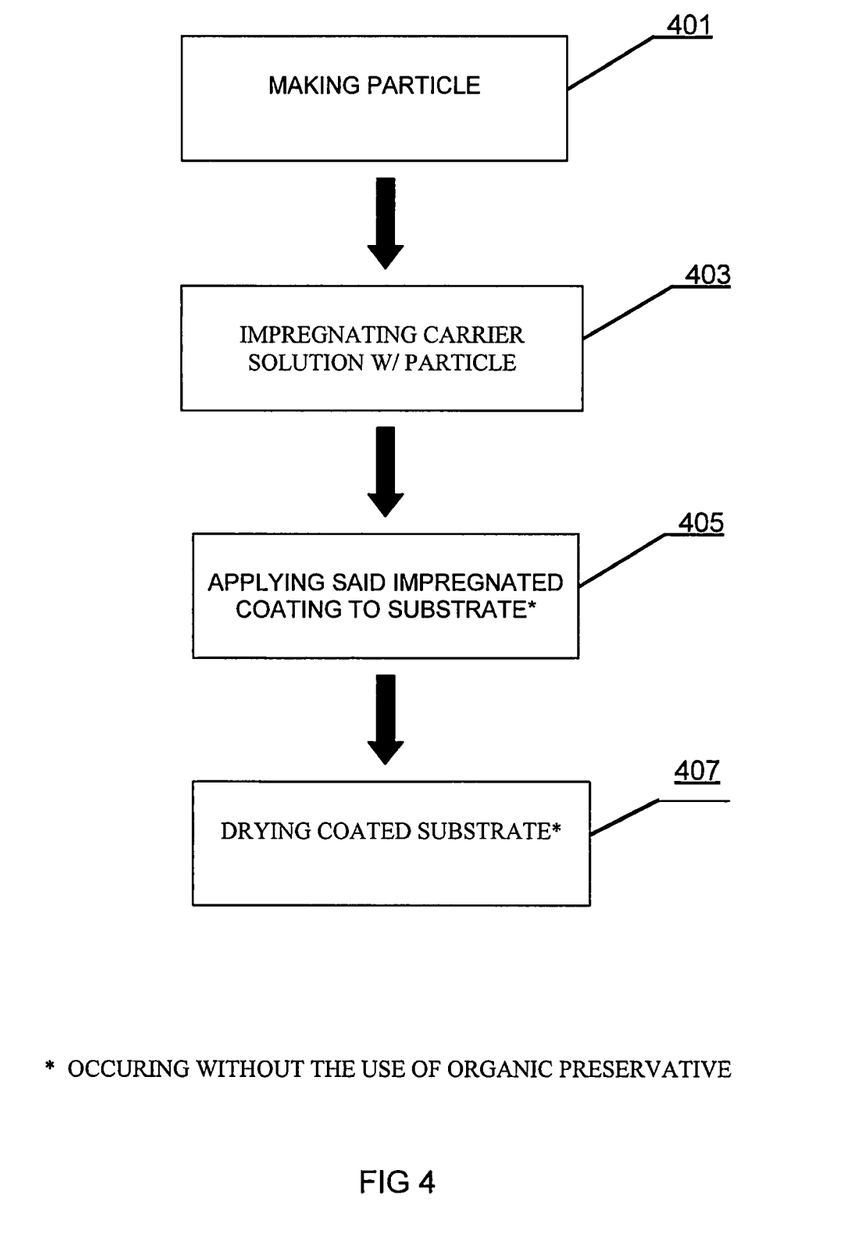
FIG. 4 shows the method of making a substrate in accordance with the present method.

FIG. 4 is an embodiment of the present method whereby a coated substrate is made, wherein a particle in accordance with the present invention is made 401, a carrier solution is impregnated with the particle 403, the carrier solution containing the nanoparticle is applied to a substrate 405, and the substrate is allowed to dry 407. Notably, in comparison with the prior art, an organic preservative is not used in any of the steps of the present method, however the resultant substrate possesses anti-bacterial properties, good look and feel, flexibility, improved water repellance, and improved rub resistance.

The particle is made 401 as previously detailed above and in FIG. 2. The particle can contain a nitrogen containing compound, for example casein and a polymer having quaternary ammonium groups in its shell, and a hydrophobic polymer, such as poly(n-butyl acrylate), in its core.

The carrier solution impregnated with the particle 403 can be a resin, for example oleo-resins, gum resins, epoxy resins, and ion exchange resins. The carrier solution can also be water. Impregnation is performed by adding the particles in an amount of from 1 to 90% to the carrier. In one embodiment, the carrier solution is water, which is impregnated with a particle containing casein and a polymer having quaternary ammonium groups in its shell and poly(n-butyl acrylate) in its core.

The carrier solution containing the particle is applied to a substrate 405 through application methods such as curtain coating, clipping, falling film enrobing, pouring, brushing, or spraying methods such as, for example, air-atomized spraying, air-assisted spraying, airless spraying, high volume low pressure spraying, and air-assisted airless spraying. The substrate may be treated by one or more coats of the impregnated carrier solution, such coats to be applied in the same application method or by different application methods. Substrates to be treated by the application methods include agricultural products including fruits, vegetables, and dairy products, and non-agricultural products such as metals such as iron, nickel, lead, zinc, copper, and steel, wood such as pines, cherry, ebony, mahogany, oaks, poplar, and rosewood, glass, ceramic such as brick, porcelain, and earthenware, plastic, such as polypropylene, polystyrene, polyethylene terephthalate, polyester, and polyvinyl chloride, textiles such as silk, cotton, glass fibers, and nylon, and animal skins including leather, for example raw hide, full grain, corrected grain, suede, patent leather, and fur. The substrate can be pre-treated prior to application of the impregnated carrier solution. In one embodiment, the impregnated carrier solution is applied to a leather substrate by applying aqueous latexes onto leather.

The coated substrate will then be allowed to dry 407 for a period of between 2 to 48 hours. Drying may occur by, for example, air drying, machine drying, machine air blow drying, and drip drying. One or more drying methods may be used in conjunction with one another, simultaneously or one after the other. In one embodiment, a coated leather substrate is allowed to air dry for a period of 24 hours at room temperature.

It is important to note that in comparison with the prior art, an organic preservative is not used to further coat the substrate, and is in fact explicitly excluded in the present method. As shown in the prior art, organic preservatives including formaldehyde, whether or not in combination with urea, phenol, or melamine, glutaraldehyde, methylene diphenyl diisocyante, methylchloroisothiazolinore, borate, sodium silicate, and ureas such as alkoxy alkyl ureas, have been used with nitrogen containing compounds, including proteins such as casein. These organic preservatives are used in the art to stop the degradation or bacterial contamination of the compounds, which can lead to environmentally damaging and/or toxic resultant compounds. In the prior art, such organic preservatives were added during the coating synthesis, i.e., when the aqueous dispersion that will be used to treat the substrate was made. The present method does not use such organic preservatives, even when a nitrogen containing protein such as casein is used to form the shell of the particle. As such, the present method allows the development of a substrate that is environmentally safe, and non-toxic.

Further, the present method does not require the coating on the substrate to be subject to further substantial treatment following its application to the substrate. In other words, the coating may simply be applied in one or more layers to the substrate, and then the substrate may be dried. It is believed this is brought about because of the nano-scaled size of the coating particles, generally less or approximately 200 nm in diameter. The use of such particle sizes results in ultrathin nano-coating, giving better properties such as appearance and adhesion.

If further substantial treatment step or steps are required following application of the coating, the cost and time to produce a dried, coated substrate will increase dramatically. Substantial treatment, as used herein, refers to treatments that change the chemical properties of the coating or its ingredients, such as adjusting the pH, adjusting the cohesiveness of the coating to the substrate, or modifying the bonds between the constituents of the coating. Substantial treatment does not include changing the physical characteristics of the coating, such as modifying its coloring, modifying its thickness, and modifying its hardness obtained through drying.

In one embodiment of the present method, the coated substrate may be used to produce products, such products possessing the characteristics of having a coating possessing biopolymer particles, such products exhibiting excellent anti-bacterial properties while possessing no organic preservatives. Method of making such products from coated substrates include techniques well-known in the art, such as stitching, cutting, sewing, hammering, sawing, compiling component parts; etching, etc.

In a still further embodiment, a coated leather substrate can be used to make leather products, including leather jackets, leather bags, leather wallets, leather purses, leather shoes, leather hats, leather gloves, leather pants, leather skirts, leather shirts, and leather underwear.

EXAMPLE

Preparation of Sample A

Casein (1.0 g) and sodium carbonate (0.4 g) were first dissolved in water (95 g) at 50° C. [3-(methacryloylamino) propyl]-trimethylammonium chloride (0.4 g) and purified n-butyl acrylate (3.6 g) were charged to the casein solution in a 250 mL water-jacketed round bottle flask equipped with a thermometer, a condenser, a magnetic stirrer and a nitrogen inlet. The mixture was then stirred under nitrogen for 30 min. An appropriate amount of tert-butyl hyderoperoxide (TBHP, 0.08 mM) was then added, and the polymerization was heated at 80° C. for 2 h under nitrogen. The polymer dispersion was subsequently filtered through a 100 mesh screen to remove coagulum if any. Solid content and pH of the resulting polymer dispersion were around 5% and pH 9.4, respectively.

Preparation of Sample B

Casein (5.0 g) and sodium carbonate (2.0 g) were dissolved in water (95 g) at 50° C. in a 250 mL water-jacketed round bottle flask equipped with a thermometer, a condenser, a magnetic stirrer, and a nitrogen inlet. The stirring rate was fixed at 380 rpm. After 12 hour the casein dispersion was filtered through a 100 mesh screen to remove coagulum if any. The resulting casein dispersion was found to have 5% solids content and pH=10.2.

Preparation of Leather Samples Coated with Casein-Based Nanoparticles

Samples A and B were evaluated as leather coating compositions using the split leather basecoat formulation given in Table 4 (all quantities are in grams of the products). The formulation ingredients were mixed after the addition of each ingredient and the formulation composition was applied in three-coats onto specimens (6×4 inch cut from split leather). The coating was dried at room temperature for 0.5 h after each application. The coated leather was dried for 24 h prior to the test.

TABLE 4

| Ingredient | Weight (g) |
| --- | --- |
| Sample (solid content 5%) | 20 |
| Pigment (Stahl P4812 jet black) | 20 |

Results

Sample A (the coated leather substrate made in accordance with the present method) in comparison to Sample B showed unexpected improvements in the areas of flexible endurance, rub resistance, water repellance, and anti-bacterial properties as well as aesthetic properties such as look and feel. Further, because Sample A was not prepared with or contains organic preservatives, Sample A is determined to be an environmentally safe product in comparison to products made according to the prior art.

Flexing Endurance Test

Figure 5:
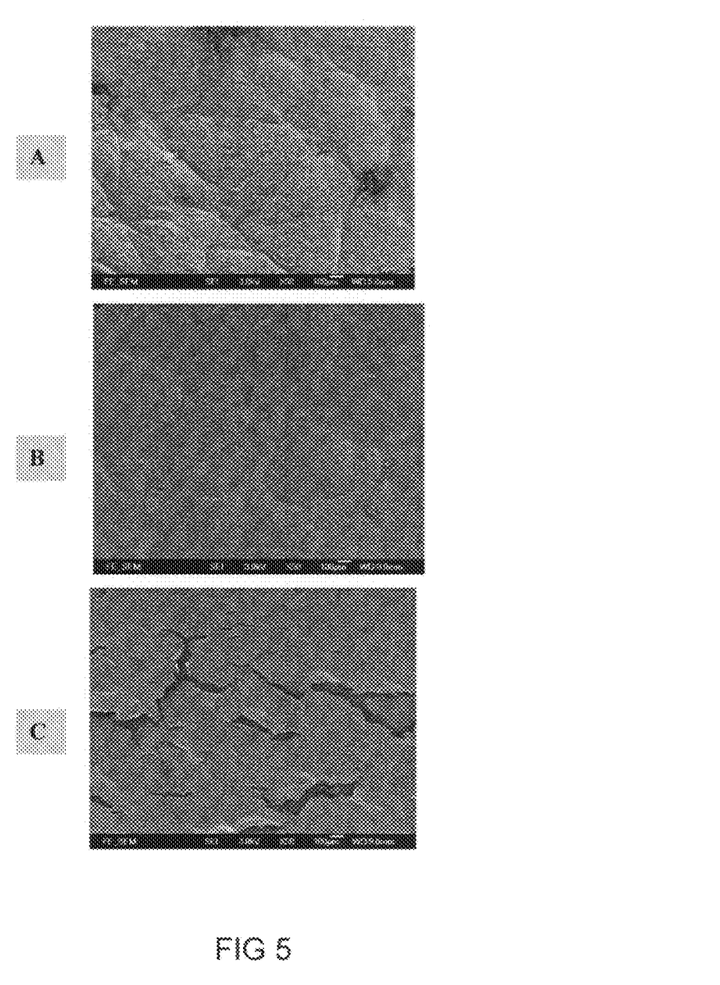
FIG. 5 is a scanning electron microscopic image (SEM) of surfaces of leather after 100 flexes: A. without any coating; B. coated with nanoparticles (Samples A); C. coated with casein solution (Sample B).

FIG. 5 shows the results of a flexing endurance test on Samples A and B. The flexing endurance test was conducted using dry leather specimens (2×1 inch) which were coated with various samples. They were flexed 100 times, and then coated with a thin layer of gold under vacuum. Morphologies of leather surfaces were observed with a Scanning Electron Microscopy (SEM) (Stereoscan 440, Leica).

After 100 flexes, many small cracks appeared on the leather surface which was coated with casein solution (Sample B), while there were almost not cracks for the leather coated with casein-based core-shell nanoparticles (Sample A). The results show that poor casein coating can be significantly improved by using the casein based core-shell nanoparticles due its good film forming property.

In addition, coatings with casein based core-shell nanoparticles (Sample A) could preserve the nature leather grain, whereas the casein coating (Sample B) covered them considerably. The results also indicated that nanoparticle coating agent had much better aesthetic function than casein coating. The coating with high aesthetic function is a desirable feature in leather coating.

Dry and Wet Rub Resistance Test

Figure 6:
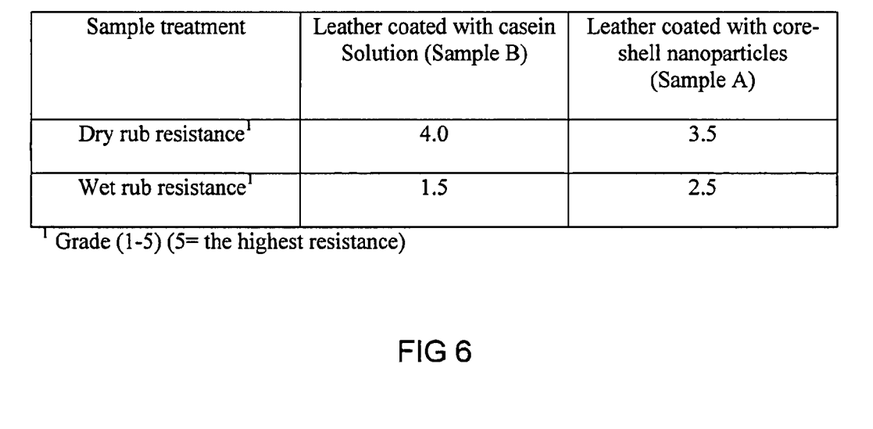
FIG. 6 are the results of a rub resistance test for a substrate made in accordance with the present invention.

FIG. 6 shows the results of a dry rub test and a wet rub test.

Dry Rub Resistance Test

A dry rub resistance test was performed using a CROCK-METER D18/0049/C037AA rub fastness tester. The dry leather specimens were rubbed with a dry cotton pad for 10 times. Each rub-cycle included one forward and one backward motion. The cotton pad was then checked with a standard color comparison card to determine the grade of dry rub resistance.

Wet Rub Resistance Test

A wet rub resistance was performed using a CROCKMETER D18/0049/C037AA rub fastness tester. The dry leather specimens were rubbed with a wet cotton pad for 10 times. Each rub-cycle included one forward and one backward motion. The cotton pad was then checked with a standard color comparison card to determine the grade of wet rub resistance.

Although the dry rub resistance of the nanoparticles was slightly lowered than the casein coating alone, dry rub resistance at Grade 3.5 is still very satisfactory for leather base coating. On the other hand, modified casein via grafting hydrophobic PnBA improved wet rub resistance from 1.5 to 2.5, Since improvement of wet rub resistance is more difficult to achieve in leather coating production, the modification described in this invention is highly desirable and significant to the leather industry.

Water Repellence

Figure 7:
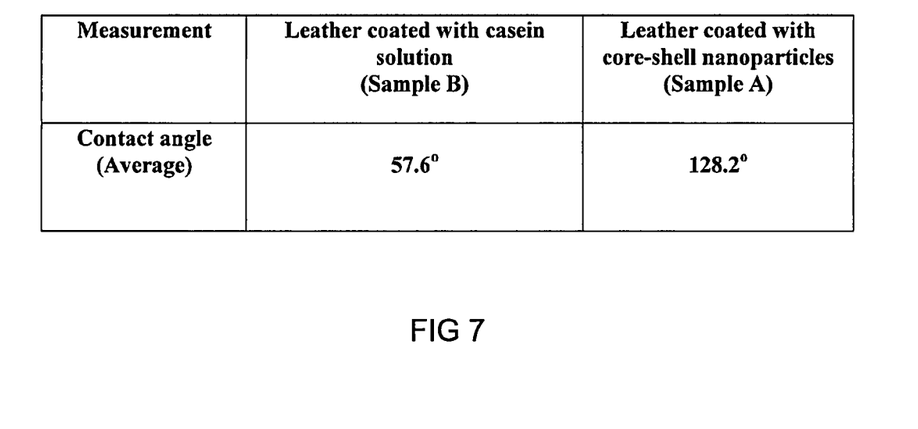
FIG. 7 shows the results of contact angle measurement for a substrate made in accordance with the present invention.

FIG. 7 shows the results of the water repellency test. The contact angles of leather coated with various samples were measure by a Tantec Contact Angle Meter at room temperature for five times. The average results of each sample indicate that leather coated with Sample A has much larger contact angle of a water drop than the leather coated with casein (Sample B). In other word, the leather coated with nanoparticles has significantly higher water repellence than the leather coated with casein solution only. In fact the contact angle of a water drop of 128° indicates that nanoparticle-coated surface is highly hydrophobic.

Regarding the effect of the particles on the surface of the leather, since leather's surface has natural pores and crevices, due to their particle size of less than 200 nm, applying the particles on the leather surface can reduce the pore size or even close these pores. In addition, casein is a protein which adheres well to the leather surface, and PnBA is a hydrophobic polymer which lowers the surface energy, thus a combination of closing the surface pores using this hydrophobically modified casein-based nanoparticles can significantly enhance the waterproofing ability. Another advantage of closing these pores using particles finish is to keep stains such as particles of dirt and other matter from penetrating the leather, so liquids can be blotted up quickly and dust and dry soil can be easily wiped away.

Antibacterial Test

Figure 8:
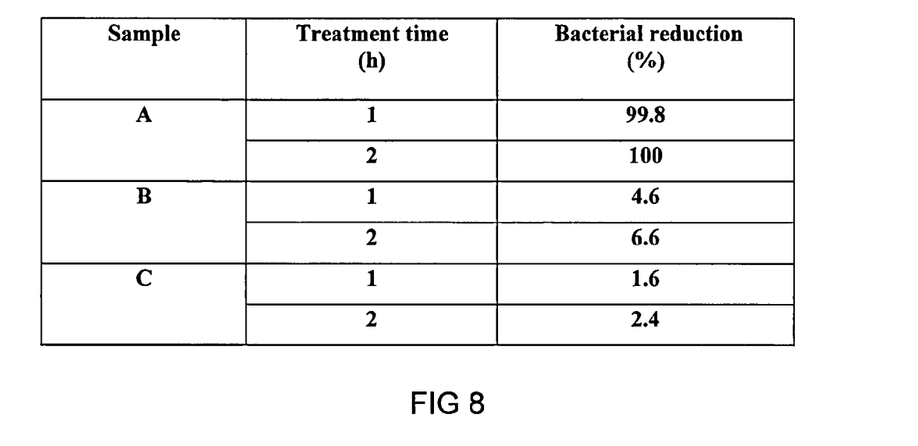
FIG. 8 shows the results of an antibacterial test for a substrate made in accordance with the present invention.

FIG. 8 shows the results of antibacterial tests on both Samples A and B, and a Sample C.

Preparation of Sample for Antibacterial Test

Preparation of Sample C

Casein (1.0 g) and sodium carbonate (0.4 g) were first dissolved in water (95 g) at 50° C. and mixed with purified n-butyl acrylate (4.0 g) in a 250 mL water-jacketed round bottle flask equipped with a thermometer, a condenser, a magnetic stirrer, and a nitrogen inlet. The mixture was stirred at 300-400 rpm under nitrogen for 30 minutes. An appropriate amount of tert-butyl hydroperoxide (TBHP, 0.08 mM) was then added, and the polymerization was heated at 80° C. for 2 h under nitrogen. The particle dispersion was subsequently filtered through a 100 mesh screen to remove coagulum, if any. Solid content and pH of the resulting particle dispersion were around 5% and pH 9.6, respectively.

Cotton specimens (10×10 cm) washed three times with distilled water and dried were immersed in various solutions containing samples A, B, and C for 8 h. The solutions contained 2 g of samples (solid content 5.0%), and 4 g distilled water. The treated cotton specimens were then examined for their antibacterial properties after drying at room temperature.

Antibacterial Activity

The antibacterial activity was evaluated quantitatively by using a shaking flask method, which determines the reduction in the number of bacterial cells after placing the sample in a shaking flask for 1 h. S. aureus (ATCC 6538), which is a gram positive bacterium commonly found on human body was chosen as the tested bacterium. A typical procedure was as follows: 1±0.1 g of sample fabric, cut into small pieces of approximately 0.5×0.5 cm, was dipped into a flask containing 50 mL of 0.5 mM PBS (monopotassium phosphate) culture solution with a cell concentration of $1.0–1.5\times10^4$/mL. The flask was then shaken at 250 rpm on a rotary shaker at 37° C. for 1 h. Before and after shaking, 1 mL of the test solution was extracted, diluted and spread onto an agar plate. After 24 h of incubation at 37° C., the number of colonies formed on the agar plate was counted and the number of live bacterial cells in the flask before and after the shaking was calculated. Antimicrobial efficacy was determined based on duplicated test results.

Results shows that casein-based nonoparticles made in accordance with the instant invention (Sample A), i.e., addition of a vinylic monomer having quaternary ammonium groups to the shell, results in a significant increase in the antibacterial property of the coated substrate, up to almost 100%. In comparison, substrates having casein-only coatings result in very low antibacterial properties at less than 7% (Sample B), and substrates having nanoparticles with casein in their shells but lacking vinylic monomers with quaternary ammonium groups, as practiced by the prior art, show extremely low antibacterial property at less than 3% (Sample C).

Having described embodiments of the present system with reference to the accompanying drawings, it is to be understood that the present system is not limited to the precise embodiments, and that various changes and modifications may be effected therein by one having ordinary skill in the art without departing from the scope or spirit as defined in the appended claims.

In interpreting the appended claims, it should be understood that:

a) the word "comprising" does not exclude the presence of other elements or acts than those listed in the given claim;

b) the word "a" or "an" preceding an element does not exclude the presence of a plurality of such elements;

c) any reference signs in the claims do not limit their scope;

d) any of the disclosed devices or portions thereof may be combined together or separated into further portions unless specifically stated otherwise; and e) no specific sequence of acts or steps is intended to be required unless specifically indicated.

The invention claimed is:

1. A method of making a coated substrate having a coating comprising a nanoparticle, the method comprising the steps of:

a) dissolving a hydrophilic nitrogen containing compound in an aqueous medium to obtain a hydrophilic nitrogen containing compound solution;

b) mixing the hydrophilic nitrogen containing compound solution of step a) with a hydrophilic vinylic monomer having a quaternary ammonium group;

c) adding a catalyst to the mixture of step b) to initiate graft copolymerization, whereby a hydrophilic grafted copolymer is formed;

d) adding a hydrophobic vinylic monomer to be polymerized with the hydrophilic grafted copolymer of step c) or with itself to obtain a mixture;

e) allowing the mixture of step d) to react; whereupon a nanoparticle is obtained and wherein the nanoparticle comprises:

(i) a shell comprising the hydrophilic grafted copolymer having a quaternary ammonium group, and (ii) a core comprising a hydrophobic vinylic polymer;

f) impregnating the nanoparticle with a carrier solution to obtain an impregnated carrier solution;

g) applying the impregnated carrier solution to a substrate to obtain a coated substrate; and h) drying the coated substrate, wherein in step b) the hydrophilic vinylic monomer is added in a weight percentage of 2 to 50% of the nitrogen containing compund:

wherein steps g) and h) are performed in the absence of an organic preservative; and wherein the coated substrate exhibits antibacterial properties.

2. The method according to claim 1, wherein the hydrophilic nitrogen containing compound is a biopolymer or synthetic polymer.

3. The method according to claim 2, wherein the biopolymer is obtained from a regenerated naturally occurring protein.

4. The method according to claim 3, wherein the naturally occurring protein is selected from the group consisting of casein, collagen gelatin, bovine serum albumin, soy protein, and silk fibroin.

5. The method according to claim 1, wherein the hydrophilic vinylic monomer having a quaternary ammonium group is of the general formula wherein $R_4$, $R_1$, $R_2$, and $R_3$ are independently selected from the group consisting of hydrogen, alkyl, alkenyl, alkynyl, acyl, aryl, carboxylate, alkoxy carbonyl, arloxycarbonyl, carboxamide, alkyl amine, acyl amino, alkoxyl, acyloxy, hydroxyalkyl, alkyoxyalkyl, aminoalkyl, (alkylamino)alkyl, thio, alkylthio, thioalkyl, (alkylhio)alkyl, carbomoyl, sulfonyl, sulfonate, sulfonamide, sulfonylamino, sulfonyloxyl, methyl, phenyl, heteraryl, and monocylic heteroaryl with 4 to 8 ring atoms, wherein the ring atoms of the monocylic heteroaryl are selected from the group consisting of nitrogen, oxygen, sulfur, chloro, cyano, and halogen; and wherein at least one of $R_1$, $R_2$, $R_3$, and $R_4$ is a vinyl containing group.

6. The method according to claim 1, wherein the aqueous medium is water.

7. The method according to claim 1, wherein the hydrophobic vinylic monomer is selected from the group consisting of $R^1R^2C{=}CH_2$, wherein $R^1$ is hydrogen or alkyl and wherein $R^2$ is alkyl, aryl, heteroaryl, substituted aryl, halo, cyano, or other hydrophobic group such that the monomer is water insoluble, $CH_2{=}CR^3COOR^4$, wherein $R^3$ is hydrogen or alkyl and wherein $R^4$ is alkyl or substituted alkyl, or other hydrophobic group such that the monomer is water insoluble, $CH_2{=}CR^3COONHR$, wherein $R^3$ is hydrogen or alkyl and wherein $R^4$ is alkyl or substituted alkyl, or hydrophobic group such that the monomer is water insoluble, and $CH_2{=}CR^1{-}CH{=}CH_2$, wherein $R^1$ is hydrogen, alkyl, or chloro.

8. The method according to claim 1, wherein the catalyst is selected from the group consisting of alkyl peroxide, hydroperoxide, an azo-initiator, persulfate, a redox initiating system, and a metal based radical initiator.

9. The method according to claim 1, wherein reacting the mixtures occurs between 30° C. and 95° C. for a period of 1 to 5 hours.

10. The method according to claim 1, wherein the carrier solution is water.

11. The method according to claim 1, wherein the applying said impregnated carrier solution occurs by curtain coating, clipping, falling film enrobing, pouring, brushing, dipping, or spraying.

12. The method according to claim 1, wherein the substrate is selected from the group consisting of agricultural food, metal, wood, glass, ceramic, plastic, textile, and animal skin.

13. The method according to claim 12, wherein the animal skin is leather.

14. The method according to claim 12, wherein the agricultural food is selected from the group consisting of a fruit, a vegetable, and a dairy product; wherein the metal, is selected from the group consisting of iron, nickel, lead, zinc, copper, and steel; wherein the wood is selected from the group consisting of pine, cherry, ebony, mahogany, oak, poplar, and rosewood; wherein the ceramic is selected from the group consisting of brick, porcelain, and earthenware; wherein the plastic is selected from the group consisting of polypropylene, polystyrene, polyethylene terephtalate, polyester, and polyvinyl chloride; wherein the textile is selected from the group consisting of silk, cotton, glass fiber, and nylon; and wherein the animal skin is fur, suede, or a leather selected from the group consisting of raw hide leather, full grain leather, corrected grain leather, and patent leather.

15. The method according to claim 1, wherein the drying in step h) occurs by air drying, heat drying, machine drying, air blow drying, or drip drying.

16. The method according to claim 1, wherein the nanoparticle is from between 50 to 500 nm in diameter.

17. The method according to claim 1, wherein a plurality of nanoparticles is formed and wherein the nanoparticles have a Dn/Dv value in the range of about 1.05 to 1.5.

18. The method according to claim 1, wherein the mixture obtained in after performing step e) has a solid content of from about in the range from 0.5 to 40% by weight.

19. The method according to claim 1, wherein the coated substrate obtained is characterized by having a higher bacterial reduction when compared to a same substrate coated with the hydrophilic nitrogen containing compound, but without addition of the vinylic monomer having a quaternary ammonium group.

* * * * *